(12) United States Patent
Dontcheva et al.

(10) Patent No.: US 12,112,097 B2
(45) Date of Patent: *Oct. 8, 2024

(54) FACILITATING DISCOVERY OF VERBAL COMMANDS USING MULTIMODAL INTERFACES

(71) Applicant: Adobe Inc., San Jose, CA (US)

(72) Inventors: Lubomira Dontcheva, Seattle, WA (US); Arjun Srinivasan, Atlanta, GA (US); Seth John Walker, Oakland, CA (US); Eytan Adar, Ann Arbor, MI (US)

(73) Assignee: Adobe Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,055

(22) Filed: Jan. 9, 2023

(65) Prior Publication Data

US 2023/0161553 A1 May 25, 2023

Related U.S. Application Data

(63) Continuation of application No. 17/469,519, filed on Sep. 8, 2021, now Pat. No. 11,573,764, which is a
(Continued)

(51) Int. Cl.
*G06F 3/16* (2006.01)
*G06F 3/0481* (2022.01)
(Continued)

(52) U.S. Cl.
CPC ............ *G06F 3/167* (2013.01); *G06F 3/0481* (2013.01); *G06F 3/0482* (2013.01);
(Continued)

(58) Field of Classification Search
CPC ...... G06F 3/167; G06F 3/0487; G06F 16/686; G06F 16/90324; G06F 3/0481;
(Continued)

(56) References Cited

U.S. PATENT DOCUMENTS

| 8,849,675 | B1 | 9/2014 | Foerster et al. |
| 2005/0114140 | A1* | 5/2005 | Brackett ................. G06F 3/167 |
| | | | 704/E15.002 |

(Continued)

FOREIGN PATENT DOCUMENTS

| AU | 2014221287 A1 | 9/2014 |
| CN | 1881162 A | 12/2006 |

(Continued)

OTHER PUBLICATIONS

Cohen, P.R., et al., "Synergistic use of direct manipulation and natural language," In ACM SIGCHI Bulletin, vol. 20, No. SI, pp. 227-233 (Mar. 1989).

(Continued)

*Primary Examiner* — Nicholas Ulrich
(74) *Attorney, Agent, or Firm* — Shook, Hardy & Bacon L.L.P.

(57) ABSTRACT

A framework for generating and presenting verbal command suggestions to facilitate discoverability of commands capable of being understood and support users exploring available commands. A target associated with a direct-manipulation input is received from a user via a multimodal user interface. A set of operations relevant to the target is selected and verbal command suggestions relevant to the selected set of operations and the determined target are generated. At least a portion of the generated verbal command suggestions is provided for presentation in association with the multimodal user interface in one of three interface variants: one that presents command suggestions as a list, one that presents command suggestions using contextual overlay windows, and one that presents command suggestions embedded within the interface. Each of the proposed interface variants facilitates user awareness of verbal com- (Continued)

mands that are capable of being executed and teaches users how available verbal commands can be invoked.

18 Claims, 16 Drawing Sheets

Related U.S. Application Data continuation of application No. 16/355,599, filed on Mar. 15, 2019, now Pat. No. 11,132,174.

(51) Int. Cl.

| | | |
|---|---|---|
| *G06F 3/0482* | (2013.01) | |
| *G06F 3/0483* | (2013.01) | |
| *G06F 3/0487* | (2013.01) | |
| *G06F 9/451* | (2018.01) | |
| *G06F 16/68* | (2019.01) | |
| *G06F 16/9032* | (2019.01) | |
| *G10L 15/22* | (2006.01) | |

(52) U.S. Cl.
CPC .......... *G06F 3/0483* (2013.01); *G06F 3/0487* (2013.01); *G06F 9/451* (2018.02); *G06F 9/453* (2018.02); *G06F 16/686* (2019.01); *G06F 16/90324* (2019.01); *G10L 15/22* (2013.01); *G06F 2203/0381* (2013.01); *G10L 2015/223* (2013.01)

(58) Field of Classification Search
CPC ...... G06F 3/0482; G06F 3/0483; G06F 9/451; G06F 9/453; G06F 2203/0381; G10L 2015/223; G10L 15/22
See application file for complete search history.

(56) References Cited

U.S. PATENT DOCUMENTS

| | | |
|---|---|---|
| 2006/0288309 A1 | 12/2006 | Cross, Jr. et al. |
| 2007/0061148 A1 | 3/2007 | Cross, Jr. et al. |
| 2008/0033727 A1 | 2/2008 | Huber et al. |
| 2010/0312547 A1 | 12/2010 | Van Os et al. |
| 2012/0110456 A1 | 5/2012 | Larco et al. |
| 2015/0256873 A1 | 9/2015 | Klein et al. |
| 2015/0261494 A1 | 9/2015 | Cohen et al. |
| 2015/0261745 A1 | 9/2015 | Song et al. |
| 2017/0371885 A1 | 12/2017 | Aggarwal et al. |
| 2018/0217810 A1* | 8/2018 | Agrawal ................. G10L 15/19 |
| 2020/0152186 A1* | 5/2020 | Koh ........................ G10L 15/08 |

FOREIGN PATENT DOCUMENTS

| | | |
|---|---|---|
| CN | 102541438 A | 7/2012 |
| DE | 10 2006 035 780 B4 | 4/2019 |
| KR | 20140064118 A | 5/2014 |

OTHER PUBLICATIONS

Findlater, L., and Gajos, K. Z., "Design space and evaluation challenges of adaptive graphical user interfaces," AI Magazine, vol. 30, No. 4, pp. 68-73 (2009).

Matejka, J., et al., "CommunityCommands: command recommendations for software applications," In Proceedings of the 22nd annual ACM symposium on User interface software and technology, pp. 193-202 (Oct. 2009).

Srinivasan, A., et al., "Discovering natural language commands in multimodal interfaces," In Proceedings of the 24th International Conference on Intelligent User Interfaces, ACM, pp. 661-672 (Mar. 2019).

Zolaktaf, S., and Murphy, G. C. "What to Learn Next: Recommending Commands in a Feature-rich Environment," In 2015 IEEE 14th International Conference on Machine Learning and Applications (ICMLA), pp. 1-63 (2015).

Benyon, D., "Adaptive systems: a solution to usability problems," User modeling and User-adapted Interaction, vol. 3, No. 1, pp. 65-87 (1993).

Findlater, L., & Mcgrenere, J., "A comparison of static, adaptive, and adaptable menus," In Proceedings of the SIGCHI conference on Human factors in computing systems, vol. 6, No. 1, pp. 89-96 (Apr. 2004).

Harada, S., et al., "Voicedraw: a hands-free voice-driven drawing application for people with motor impairments," In Proceedings of the 9th international ACM SIGACCESS conference on Computers and accessibility, pp. 27-34 (Oct. 2007).

Shneiderman, B., and Maes, P., "Direct manipulation vs. interface agents," Interactions, vol. 4, No. 6, pp. 42-61 (1997).

Yankelovich, N., "How do users know what to say?," interactions, vol. 3, No. 6, pp. 32-43 (1996).

Feng, J., et al., "How productivity improves in hands-free continuous dictation tasks: lessons learned from a longitudinal study," Interacting with computers, vol. 17, No. 3, pp. 265-289 (2005).

Grossman, T., et al., "A survey of software learnability: metrics, methodologies and guidelines," In Proceedings of the SIGCHI Conference on Human Factors in Computing Systems, ACM, pp. 649-658 (Apr. 2009).

Paymans, T. F., et al., "Usability trade-offs for adaptive user interfaces: ease of use and learnability," In Proceedings of the 9th international conference on Intelligent user interfaces, pp. 301-303 (Jan. 2004).

Walker, M. A., et al., "What can I say ?: Evaluating a spoken language interface to email," In Proceedings of the SIGCHI Conference on Human Factors in Computing Systems, pp. 582-589 (Jan. 1998).

Corbett, E., and Weber, A., "What can I say ?: addressing user experience challenges of a mobile voice user Interface for accessibility," In Proceedings of the 18th International Conference on Human-Computer Interaction with Mobile Devices and Services, pp. 72-82 (Sep. 2016).

Furqan, A., et al., "Learnability through Adaptive Discovery Tools in Voice User Interfaces," In Proceedings of the 2017 CHI Conference Extended Abstracts on Human Factors in Computing Systems, pp. 1-43 (May 2017).

Myers, C., et al., "Patterns for How Users Overcome Obstacles in Voice User Interfaces," In Proceedings of the 2018 CHI Conference on Human Factors in Computing Systems, pp. 1-7 (Apr. 2018).

Tsandilas, T., and Schraefel, M., C., "An Empirical Assessment of Adaptation Techniques," In CHI '05 Extended Abstracts on Human Factors in Computing Systems, pp. 2009-2012 (Apr. 2005).

\* cited by examiner

| Operation | | Parameters | Applicable to | Phrasing Templates | Examples |
|---|---|---|---|---|---|
| Filter | Add Filter | *name, value | Canvas image, Entity, Region, Image tile | Apply a ___ filter on ___<br>Add a ___ ___ effect to the canvas<br>Add ___ ___ effect here<br>Apply ___ filter | Apply a grayscale filter on all cars<br>Add a heavy saturate effect to the canvas<br>Add light morph effect here<br>Apply sepia filter |
| | Edit Filter | *name, *value | Canvas image, Entity, Region, Image tile | Set the value of the ___ filter on ___ to ___<br>Change ___ effect on ___ to ___<br>Make ___ filter ___<br>Set ___ effect to ___ | Set the value of the sepia filter on the person to light<br>Change gray scale effect on all images to heavy<br>Make morph filter light<br>Set saturate effect to heavy |
| | Remove Filter | *name | Canvas image, Entity, Region, Image tile | Remove the canvas ___ effect<br>Delete the ___ filter on ___<br>Delete the ___ effect on this<br>Remove all filters | Remove the canvas morph effect<br>Delete the sepia filter on the dog<br>Delete the sepia effect on this<br>Remove all filters |
| Style | Fill Color | *color | Shape | Update the fill color on ___ to ___<br>Change the color of ___ to ___<br>Fill ___<br>Set fill to ___ | Update the fill color on all rectangles to blue<br>Change the color of the rectangle to red<br>Fill orange<br>Set fill to blue |
| | Border Color | *color | Shape | Change the border color of ___ to ___<br>Set the stroke of ___ to ___<br>Make the stroke of this ___<br>Color stroke ___ | Change the border color of the rectangles to green<br>Set the stroke of all rectangles to black<br>Make the stroke of this red<br>Color stroke green |
| | Border Size | *width | Shape | Update stroke size of ___ to ___<br>Change the border thickness of ___ to ___<br>Make stroke width ___<br>Set the border size of this to ___ | Update stroke size of all rectangles to eight<br>Change the border thickness of the rectangle to five<br>Make stroke width eight<br>Set the border size of this to five |
| Delete | | | Image tile, Region, Shape | Delete ___ from the canvas<br>Delete ___<br>Delete ___<br>Delete this | Delete all drawn regions from the canvas<br>Delete all images<br>Delete<br>Delete this |
| Label | | *newLabel | Entity, Image tile, Region, Shape | Set the label ___ to ___<br>Label this a ___ | Set the label to sunny region<br>Label this as Ross |
| Copy | | copyCount | Image tile, Shape | Create a copy of ___<br>Make ___ copies of ___ on the canvas<br>Create a copy<br>Make ___ copies | Create a copy of the image<br>Make two copies of all rectangles on the canvas<br>Create a copy<br>Make six copies |
| Activate Tool | | *toolName | Entity, Image tile, Region, Shape | Set the label ___ to ___<br>Label this a ___ | Set the label to sunny region<br>Label this as Ross |
| Insert Shape | | fillColor, strokeColor, strokeWidth | Canvas image | Add a rectangle on the canvas<br>Add a rectangle with fill ___ and stroke ___ | Add a rectangle on the canvas<br>Add a rectangle with fill red and stroke orange |

FIG. 3.

FACILITATING DISCOVERY OF VERBAL COMMANDS USING MULTIMODAL INTERFACES

CROSS-REFERENCE TO RELATED APPLICATIONS

This application is a Continuation of U.S. patent application Ser. No. 17/469,519, filed on Sep. 9, 2021, which itself is a Continuation of U.S. patent application Ser. No. 16/355,599 filed Mar. 15, 2019, the entire contents of which are incorporated by reference herein.

BACKGROUND

Discoverability (awareness and understanding) of appropriate verbal commands represents a long-standing challenge for users of speech-based interfaces. In fact, discoverability, in terms of a user not knowing what verbal commands are available (awareness) and/or how to phrase commands such that they will be understood by the system supporting the interface (understanding), is second only to speech-recognition accuracy issues when it comes to obstacles faced by users of speech-based interfaces. Users often end up guessing at verbal commands that they believe the supporting system might recognize and/or using phraseology or vernacular they are used to but might not be understood by the system, both of which often lead to execution errors and frustration.

One approach to address these challenges of discoverability has been for systems to present users with a list of exemplary commands as part of the onboarding experience, as this is a natural time to expose users to the operations and commands supported by a speech-based system. However, such lists presented during onboarding, when users are not engaged in any particular task or action, often are closed by users before being thoroughly and completely reviewed. Even if a user thoroughly reviews an exemplary command list, the presented commands often are forgotten by the time the user attempts to employ a command while engaging in an action or task.

To make users aware of newly supported and/or infrequently used commands, some solutions send notifications to users to remind them of available commands or when new commands become available. Similarly, some solutions send users weekly emails with available command reminders and updates. However, presenting exemplary command suggestions only periodically is insufficient as users tend to forget these commands by the time they are engaged in performing actions and/or tasks utilizing the speech-based system.

SUMMARY

Embodiments of the present disclosure relate to, among other things, a framework for generating and presenting examples of verbal commands to facilitate discoverability of relevant verbal commands understood by systems that support multimodal interfaces. The framework described herein additionally permits users to incrementally explore available verbal commands. The described framework enables command discoverability by providing exemplary verbal command suggestions when non-verbal (e.g., direct-manipulation) inputs are used. A target associated with a direct-manipulation input (e.g., a touch input, a keyboard input, or a mouse input) received from a user via a multimodal user interface is determined and one or more exemplary verbal command suggestions is generated that are relevant to the target. At least a portion of the generated verbal command suggestions is provided for presentation in association with the multimodal user interface utilizing one of three interface variants. The variants include an interface that presents verbal command suggestions using a list-based approach, an interface that uses contextual overlay windows to present verbal command suggestions, and an interface that presents verbal command suggestions that are embedded within the GUI ("Graphical User Interface"). Each of the proposed interface variants facilitates user awareness of verbal commands that the system supporting the multimodal interface is capable of executing and simultaneously teaches users how available verbal commands can be invoked (e.g., appropriate phrasing variants and multimodal interactions).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 is a schematic diagram illustrating an exemplary list of phrasing templates associated with a set of operations that may be selected when a target involves image editing, in accordance with implementations of the present disclosure;

DETAILED DESCRIPTION

Figure 1:
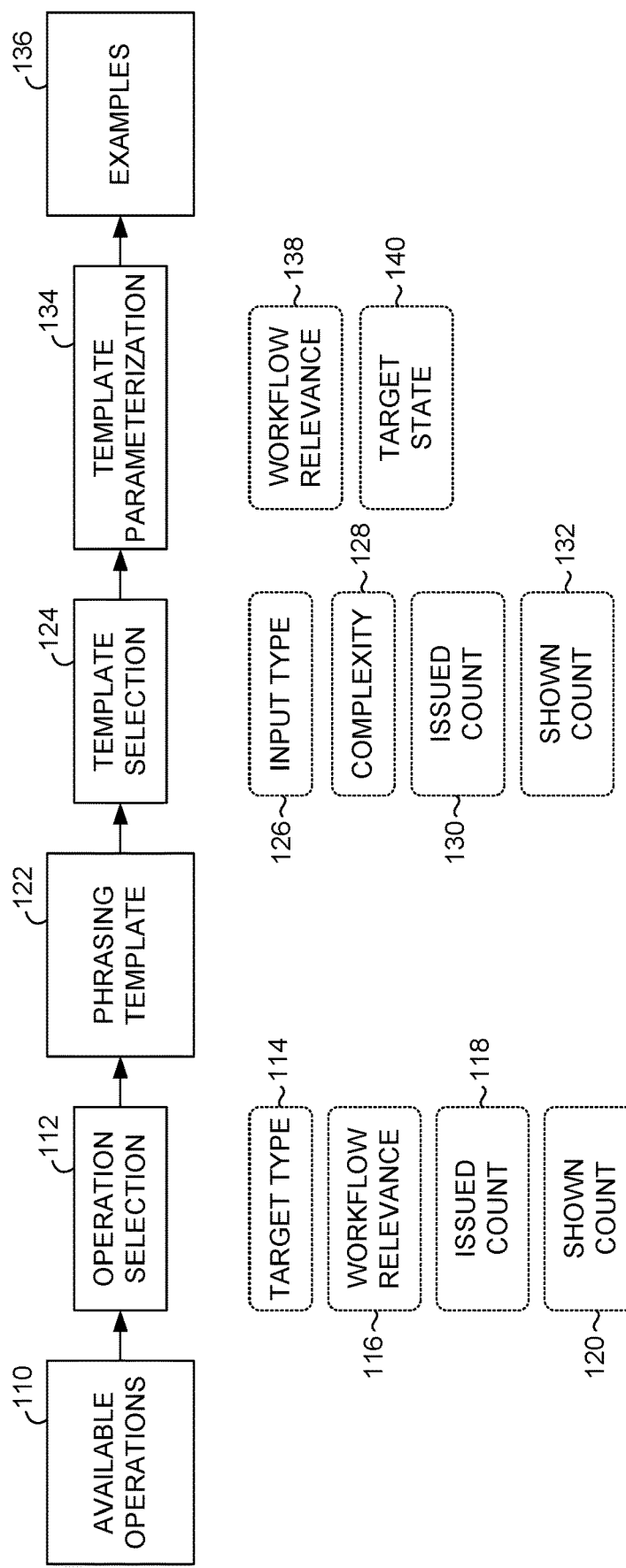
FIG. 1 is a schematic diagram illustrating a high-level overview of a command suggestion generation framework in accordance with implementations of the present disclosure.

The subject matter of the present disclosure is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Discovering verbal commands that are available and how such verbal commands can be phrased such that they are understood by a supporting system remains a long-standing challenge for users of natural language interfaces (NLIs). Improvements in speech-to-text engines and the prevalence of commercial speech interfaces as part of speech-only and multimodal solutions have introduced more end-users to this modality. However, the "invisible" nature of speech (and other verbal inputs), relative to other GUI elements, makes it particularly challenging for users to learn and adopt. Discoverability in this context entails not only making users aware of the operations that can be performed using verbal commands (i.e., awareness) but also educating users on how verbal commands should be phrased so that the system can interpret them correctly (i.e., understanding). Lack of support for discovery of verbal commands often results in users having to guess at supported verbal commands and/or phrasings. However, because guesses are more likely to be misinterpreted, causing increased errors, users that have been exposed to such systems may be discouraged from using verbal input altogether, regardless of the system being employed by a user.

Multimodal interfaces supporting verbal input and at least one form of direct manipulation input (e.g., touch input, keyboard input, mouse input, eye-tracking, in-air gestures, or the like) offer an advantage over speech-only interfaces. As multiple input modalities can provide complementary strengths, direct manipulation input can help people use verbal input more effectively and vice-versa. For example, in a multimodal document reader, a speech-only interface may make it hard for a user to ask for the appropriate pronunciation of a word. A user would need to guess the pronunciation of the same word that s/he wants the system to pronounce. With a multimodal interface supporting, by way of example only, speech and touch, a user can point to a word and ask for its pronunciation. Conversely, verbal input can aid interfaces that accept direct manipulation input. For instance, rather than learning where and how to invoke operations within a GUI, the user could simply point at a word and say, "pronounce this." As applications begin to support more intelligence (e.g., entity recognition in images), the opportunity for multimodal interaction grows. For example, in a multimodal image editor, a user can point to a person in an image and issue the command "remove shadow on face." However, the question remains: how does a user discover what they can say and how to say it?

Embodiments of the present disclosure address the challenges of educating users of multimodal user interfaces on what commands they can say to invoke their desired outcomes and the appropriate manner of inputting such commands (e.g., phraseology and the like) such that the system supporting the multimodal interface understands their desired outcomes. To this end, embodiments of the present disclosure facilitate discovery of verbal commands (e.g., natural language verbal commands) in multimodal user interfaces by permitting users to interactively select targets via a direct-manipulation modality (e.g., touch, keyboard, mouse, etc.) and, in response, presenting exemplary verbal commands in association with the multimodal user interface. In this way, non-speech modalities can help the user focus the high level question "What can I say?" to a more particular "What can I say here and now?" Embodiments hereof further facilitate discovery of verbal commands in multimodal user interfaces by providing relevant command suggestions in direct, temporal association with the interface by presenting exemplary verbal command suggestions in the interface while it is being utilized by the user. Contemplated are three interface variants. A first variant is an interface that presents suggestions using a list-based approach (referred to herein as an "exhaustive" interface). A second variant is an interface that uses contextual overlay windows to present suggestions (referred to herein as an "adaptive" interface). A third variant is an interface that embeds commands within the GUI (referred to herein as an "embedded" interface). The interface variants facilitate making users aware of what operations the system supporting the multimodal user interface is capable of executing and simultaneously teaches them how available verbal commands can be invoked (e.g., appropriate phrasing variants and multimodal interactions).

With reference now to the drawings, FIG. 1 is a schematic diagram illustrating a high-level overview of a command suggestion generation framework 100 in accordance with implementations of the present disclosure. Given a target (i.e., a region of a multimodal user interface that is the object of a direct-manipulation input) for which verbal commands are to be suggested, the framework iterates through a listing or catalog of available operations 110 (i.e., system actions that are capable of being performed) for the target. A subset of operations for which exemplary verbal command suggestions are to be generated is selected 112. Such selection may be based upon, by way of example only, one or more of a type associated with the target 114, relevance of an operation to a workflow engaged in by the user 116, the number of times a verbal command has been issued for an operation for the user (or for a set of users, e.g., all users)118 ("operation issued-count") and the number of times an operation previously has been presented in suggested commands for the user (or for a set of users, e.g., all users) 120 ("operation shown-count").

For the selected operations, the system then traverses through a predefined listing or catalog of phrasing templates 122 and selects 124 at least one to present. Such template phrasing selection may be based upon, by way of example only, one or more of a type associated with the received direct-manipulation input 126 (i.e., how the input leading to verbal command suggestion generation was invoked), complexity of the phrasing template 128 (i.e., the number of parameters needed to complete the template), the number of times a phrasing template has been issued for the selected operation for a particular user (or for a set of users, e.g., all users) 130 ("template issued-count") and the number of times the phrasing template has been presented in suggested commands for a particular user (or for a set of users, e.g., all users) 132 ("template shown-count").

Finally the framework populates 134 any modifiable parameters (i.e., characteristics for which more than one value may be appropriate such as color names, filter names, tool names, and the like) included in the selected templates with sample parameter values in order to generate 136 the final exemplary verbal command suggestions to be provided for presentation to the user. The modifiable parameters may be populated based upon, by way of example only, one or more of relevance to a workflow engaged in by the user 138 and an active state of the target 140.

Figure 2:
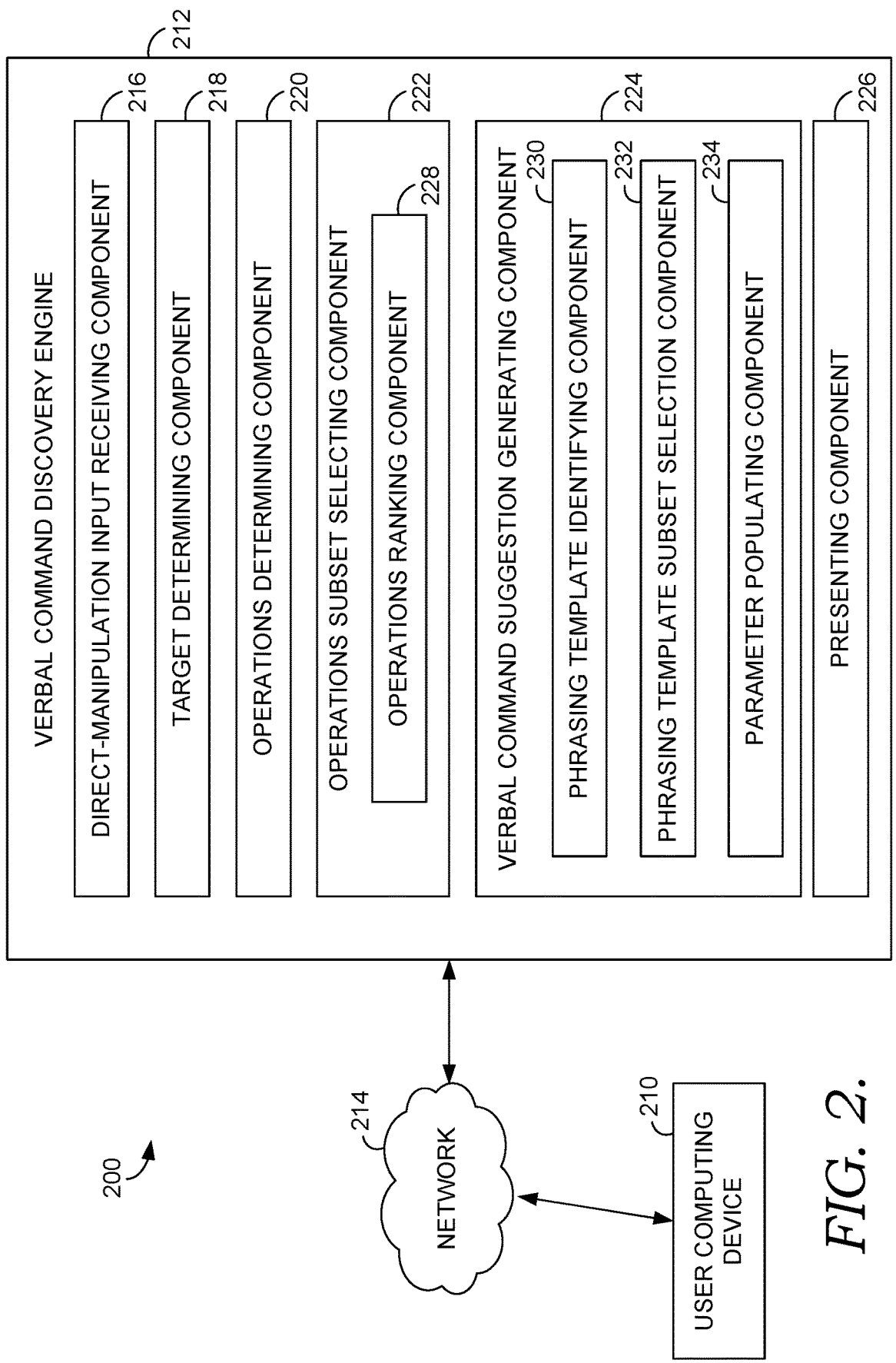
FIG. 2 is a block diagram illustrating an exemplary system for facilitating discovery of verbal commands in multimodal user interfaces, in accordance with implementations of the present disclosure.

Turning to FIG. 2, a block diagram is shown illustrating an exemplary system 200 for facilitating discovery of natural language commands in multimodal user interfaces. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 is an example of a suitable architecture for implementing certain aspects of the present disclosure. Among other components not shown, the system 200 includes a user computing device 210 interacting with a verbal command discovery engine 212 to facilitate discovery of verbal commands using multimodal user interfaces. Each of the components shown in FIG. 2 can be provided on one or more computing devices, such as the computing device 900 of FIG. 9, discussed below. As shown in FIG. 2, the user computing device 210 and the verbal command discovery engine 212 can communicate via a network 214, which may include, without limitation, one or more local area networks (LANs) and/or wide area networks (WANs). Such networking environments are commonplace in offices, enterprise-wide computer networks, intranets, and the Internet. It should be understood that any number of user devices and verbal command discovery engines may be employed within the system 200 within the scope of the present disclosure. Each may comprise a single device or multiple devices cooperating in a distributed environment. For instance, the verbal command discovery engine 212 could be provided by multiple server devices collectively providing the functionality of the verbal command discovery engine 212 as described herein. Additionally, other components not shown also may be included within the network environment.

The verbal command discovery engine 212 generally is configured to facilitate discovery of verbal commands in multimodal user interfaces. Multimodal user interfaces are user interfaces that support more than one mode of input. In aspects hereof, exemplary multimodal interfaces support verbal input (e.g., speech input) and direct-manipulation input (e.g., input received via touch, a keyboard, eye-tracking, in-air gestures, a mouse, or other non-verbal input). The user device 210 can access and communicate with the verbal command discovery engine 212 via a web browser or other application running on the user computing device 210. Alternatively, the verbal command discovery engine 212 may be installed on the user computing device 210 such that access via the network 214 is not required.

The verbal command discovery engine 212 includes a direct-manipulation input receiving component 216, a target determining component 218, an operations determining component 220, and operations subset selecting component 222, a verbal command suggestion generating component 224 and a presenting component 226. The direct-manipulation input receiving component 216 is configured for receiving direct-manipulation inputs from a user via a multimodal interface associated with the user computing device 210. Direct-manipulation inputs may include, by way of example only, touch inputs, keyboard inputs, mouse click inputs, and hover inputs.

The target determining component 218 is configured for determining a target associated with a received direct-manipulation input. A target is a region of a multimodal user interface that is the object of a direct-manipulation input. Thus a target may be an object, application, user interface element, image, text, or the like that is located in proximity to a location in a multimodal interface from which a direct-manipulation input is received. By way of example, if a received direct-manipulation input is a touch input received in association with an image, the target may be an object in that image (e.g., background image, a person, shape, etc.) that was located under a user's finger when the touch input was received. A target may also be a widget, an icon, a toolbar, a toolbar function, or the like. Thus, by way of example, if a received direct-manipulation input is a mouse-click input received in association with a function indicator located in a tool bar, the target may be the function indicator itself and, accordingly, the corresponding function. Any object, element, application, image, or the like associated with a multimodal interface can be a target when it is associated with a received direct-manipulation input.

The operations determining component 220 is configured for determining a plurality of operations that are available and that are capable of being performed with respect to a target of a direct-manipulation input. The determined list of operations is generally predefined by the system 200 and stored in association with (or in a separate data store (not shown) accessible by) the verbal command discovery engine 212. The operations subset selecting component 222 is configured for selecting a subset of the operations determined by the operations determining component 220 for which to focus generated verbal command suggestions. Selecting an appropriate subset of operations may be based on a number of factors. A first exemplary factor may be relevance of an operation to the type of target for which suggested verbal commands are being generated (114 of FIG. 1). For example, in generating verbal command suggestions relevant to a shape presented on the multimodal interface, the system 200 likely would select the "fill color" operation as it would be relevant to the type of target (e.g., the shape) and likely would not select the "filter" operation as such would be irrelevant to the target type.

A second exemplary factor may be relevance of an operation to a workflow engaged in by the user (116 of FIG. 1). A "workflow," as the term is utilized herein, is a set of operations that help a user accomplish a task or action. Workflows generally are predefined by the system 200 but also may be defined by a user. For instance, if a user is engaged in a workflow using an image editing application to alter a color image by making it black and white and changing a border color from black to white, a relevant workflow may involve the operations "Apply a grayscale filter" and "Change the border color to white." In embodiments of the present disclosure, if the system 200 determines that the user is engaged in a workflow, operations relevant to the workflow may be considered by the operations subset selecting component 222 in selecting the operations subset.

A third exemplary factor that may be used by the operations subset selecting component 222 to select an appropriate subset of operations is issued-count (118 of FIG. 1).

"Issued count," as the term is utilized herein, refers to the number of times a verbal command has been issued for an operation for a particular user (or, in some embodiments, for a set of users, e.g., all users). In some embodiments, operations for which verbal commands are frequently issued may be given priority as such operations may represent actions frequently engaged in by users in association with the determined target. In other embodiments, operations for which verbal commands are infrequently issued may be given priority as such may educate the user as to operations that can be performed by the system 200.

A fourth exemplary factor that may be used by the operations subset selecting component 222 to select an appropriate subset of operations is shown-count (120 of FIG. 1). "Shown-count," as the term is utilized herein, refers to the number of times an operation previously has been presented in verbal command suggestions for a particular user (or, in some embodiments, for a set of users, e.g., all users). In some embodiments, operations for which verbal commands are frequently presented may be given priority as such operations may represent actions frequently engaged in by users in association with the determined target. In some embodiments, operations for which verbal commands are infrequently presented may be given priority as such may educate the user as to operations that are capable of being performed by the system 200.

The operations subset selecting component 222 includes an operations ranking component 228. The operations ranking component 228 is configured for ranking operations comprising a plurality of operations relative to one another to generate a suggestion ranking. In embodiments, one or more of the factors previously set forth (i.e., target type, workflow relevance, issued-count, and shown-count) may be utilized by the operations ranking component 228 for generating the suggestion ranking in accordance with a predetermined set of priority rules. Once a suggestion ranking is generated, the operations subset selecting component 222 is configured to utilize the suggestion ranking, at least in part, to select a subset of operations on which generated verbal command suggestions will be focused.

The verbal command suggestion generating component 224 is configured for generating a plurality of verbal command suggestions that are relevant to a subset of operations selected by the operations subset selecting component 222. The verbal command suggestion generating component 224 includes a phrasing template selecting component 230, a phrasing template subset selecting component 232 and a parameter populating component 234. Phrasing templates generally are predefined by the system 200 though, in some embodiments, they may be predefined by a user. By way of example only, FIG. 3 illustrates a list of phrasing templates associated with a set of operations that may be selected by the operations subset selecting component 222 when a target involves image editing. It will be understood and appreciated by those having ordinary skill in the art that such listing is intended only to be exemplary and not to limit embodiments hereof in any way. Similarly, it will be understood and appreciated that the framework and system described herein are not specific to image editing tools and can be used by other multimodal systems to enhance verbal command discoverability.

The phrasing template selecting component 230 is configured for selecting, generally through traversing through a predefined list of phrasing templates, a plurality of phrasing templates that are relevant to a subset of operations selected by the operations subset selecting component 222. The phrasing template subset selecting component 232 is configured for selecting a phrasing template for each operation comprising the selected subset of operations. In embodiments, the phrasing template subset selecting component 232 may consider four exemplary factors when selecting phrasing templates. The first exemplary factor is the type of input received (126 of FIG. 1), that is, the manner in which the direct-manipulation input leading to verbal command suggestion generation was invoked. A second exemplary factor is the complexity of the phrasing template (128 of FIG. 1) as evidenced by the number of parameters that are required to complete the template. In some embodiments, the default of the system 200 is to select phrasing templates having the lowest complexity (that is, the lowest number of modifiable parameters). In embodiments, whenever an operation is performed by a user more than once, the complexity of selected phrasing templates may be increased, for instance, by one parameter until a pre-defined maximum number of parameters has been reached. Thus, in embodiments, users are incrementally exposed to complex verbal commands as they learn to perform basic operations.

A third exemplary factor is the issued-count (130 of FIG. 1), that is, the number of times a phrasing template has been issued for the selected operation for a particular user (or for a set of users, e.g., all users). A fourth exemplary factor is the shown-count (132 of FIG. 1), that is, the number of times the phrasing template has been shown to a particular user (or to a set of users, e.g., all users). In some embodiments, phrasings with low issued-count and low shown-count are ranked higher than those with high issued-count and high shown-count.

Often, phrasing templates include at least one modifiable parameter. As such, the parameter populating component 234 of the verbal command suggestion generating component 224 is configured for populating phrasing templates having parameters with exemplary parameter values. In embodiments, if the verbal command discovery engine 212 determines that the user is engaged in a workflow, the parameter populating component 234 may select parameter values that are workflow-oriented. In embodiments, the parameter populating component 234 may select parameter values that differ from the target's current state. For instance, if the determined target is a green rectangle, the suggested fill command when touching the green rectangle would be colors other than green.

The suggestion presenting component 226 is configured for presenting determined, filtered, ranked and populated verbal command suggestions in association with a multi-modal user interface. Contemplated for presentation are three interface variants: an "exhaustive" interface, an "adaptive" interface and an "embedded" interface. Each of the interface variants facilitates users discovering commands in-situ but make different trade-offs and represent distinct points in the design space of verbal command suggestions to aid command awareness and understanding. The exhaustive interface presents a list of all available operations and example commands for each operation. The adaptive interface presents focused suggestions using contextual overlays that appear when users directly manipulate the active window or parts of the interface. These suggestions appear next to the target of the direct-manipulation input. Finally, the embedded interface presents suggestions next to one or more GUI elements. By varying when, where, and what exemplary commands are presented, the different interfaces encourage different types of discovery and mapping between verbal commands and interface elements.

Figure 4:
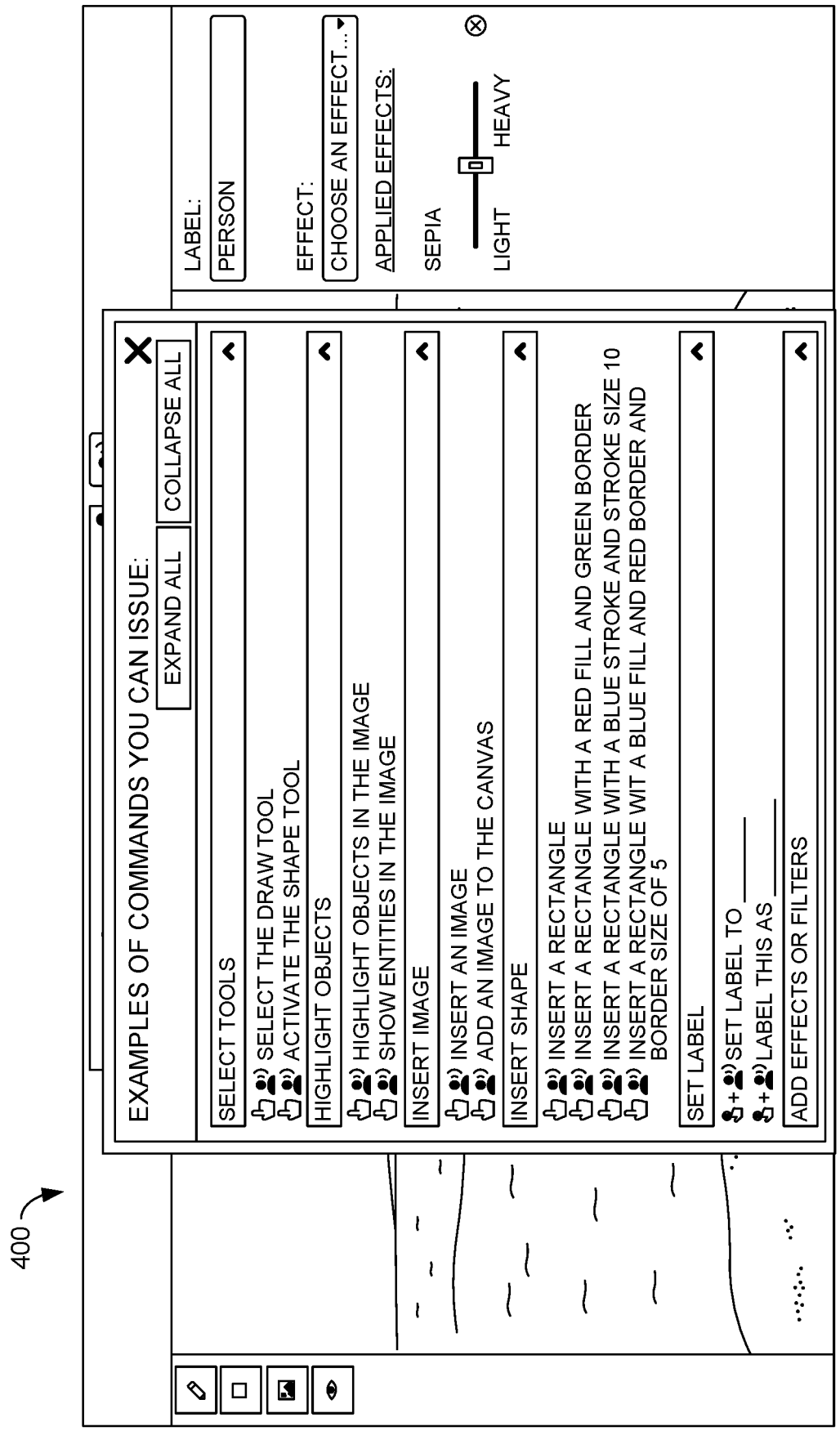
FIG. 4 is an exemplary screen display illustrating an exhaustive interface in accordance with implementations of the present disclosure.

FIG. 4 is an exemplary screen display 400 illustrating an exhaustive interface. The exhaustive interface is modeled after traditional command menus that show a list of available commands for all operations. In embodiments, users can select an appropriate invocation trigger in the screen display (e.g., a microphone indicator) to be presented with a comprehensive list of available operations and example commands for each operation. A portion of the resultant list is shown in FIG. 4. To aid readability, the commands may be grouped by operations (as shown) and users may be permitted to collapse/expand operation groups to focus on operations of interest. In embodiments, the exhaustive interface may use some contextual information and deemphasize operations and commands that are not applicable to the active state of the interface. For example, if an image editing application is being utilized and there are no shapes in the active window, the commands for operations corresponding to shapes (e.g., fill color, border size, etc.) may be faded out (or otherwise deemphasized). The exhaustive interface helps users discover a breadth of commands applicable to an active state of the interface.

Figure 5A:
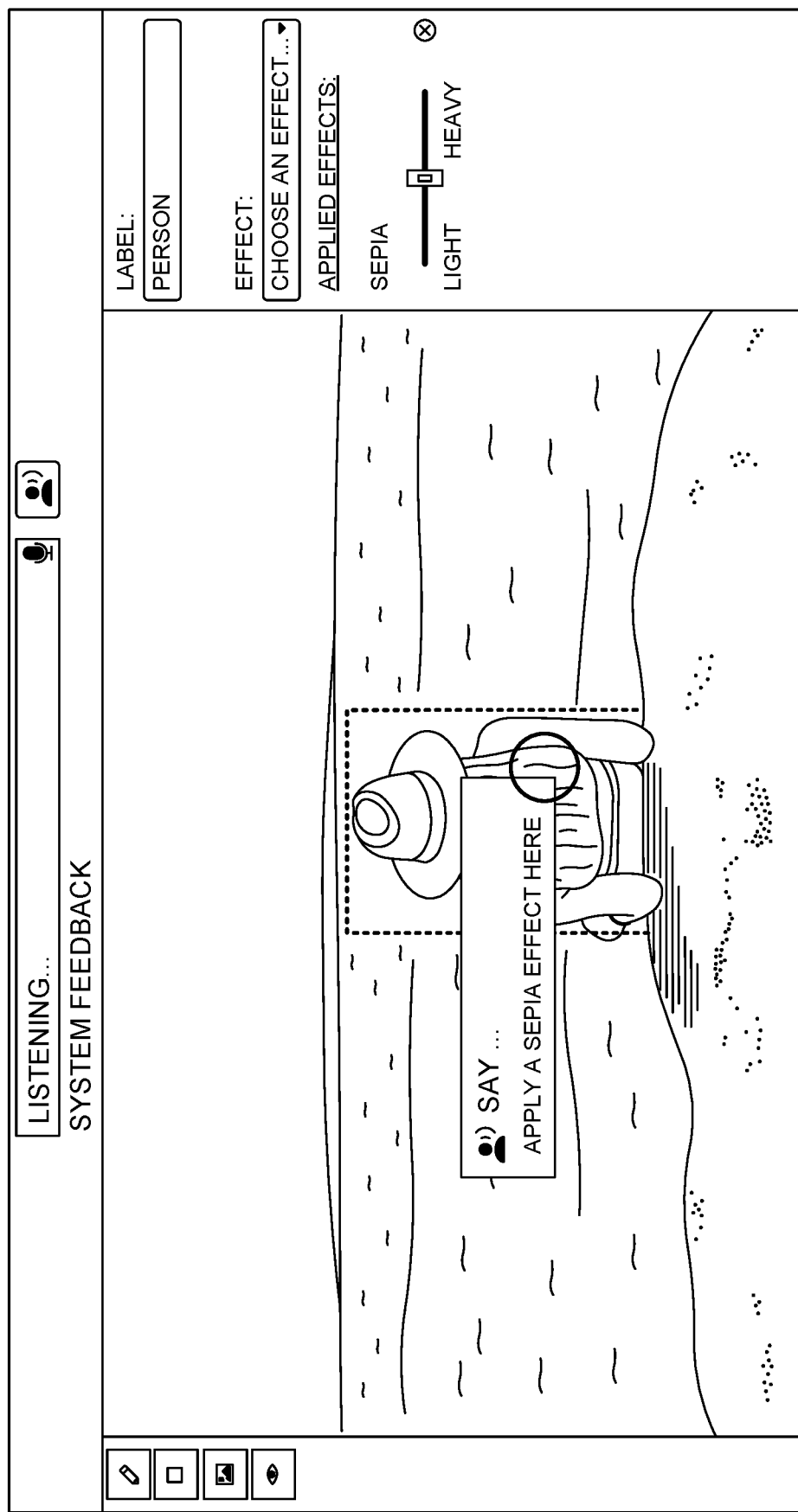
FIGS. 5A-5E depict exemplary screen displays illustrating an adaptive interface in accordance with implementations of the present disclosure.
Figure 5B:
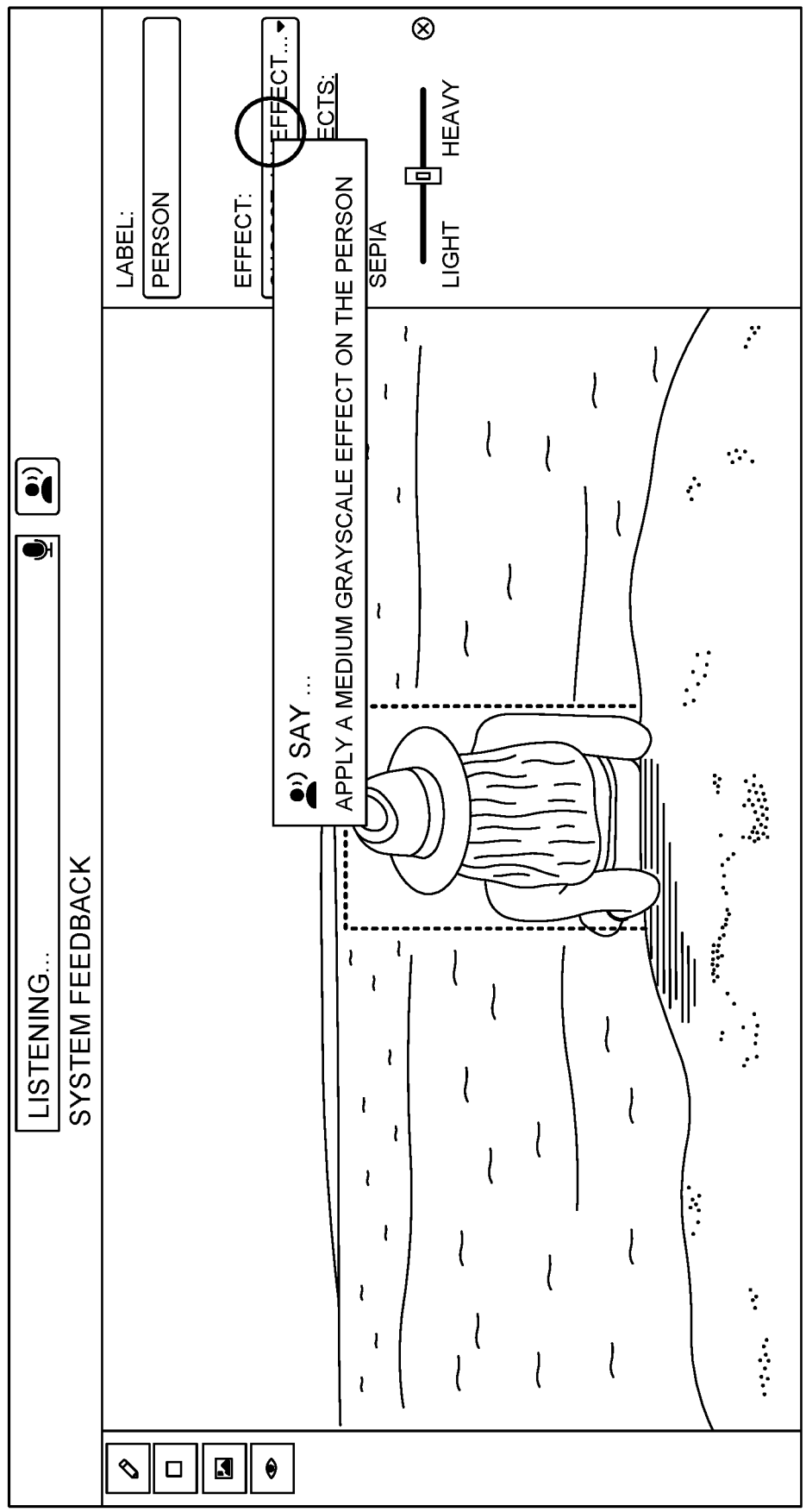
Figure 5C:
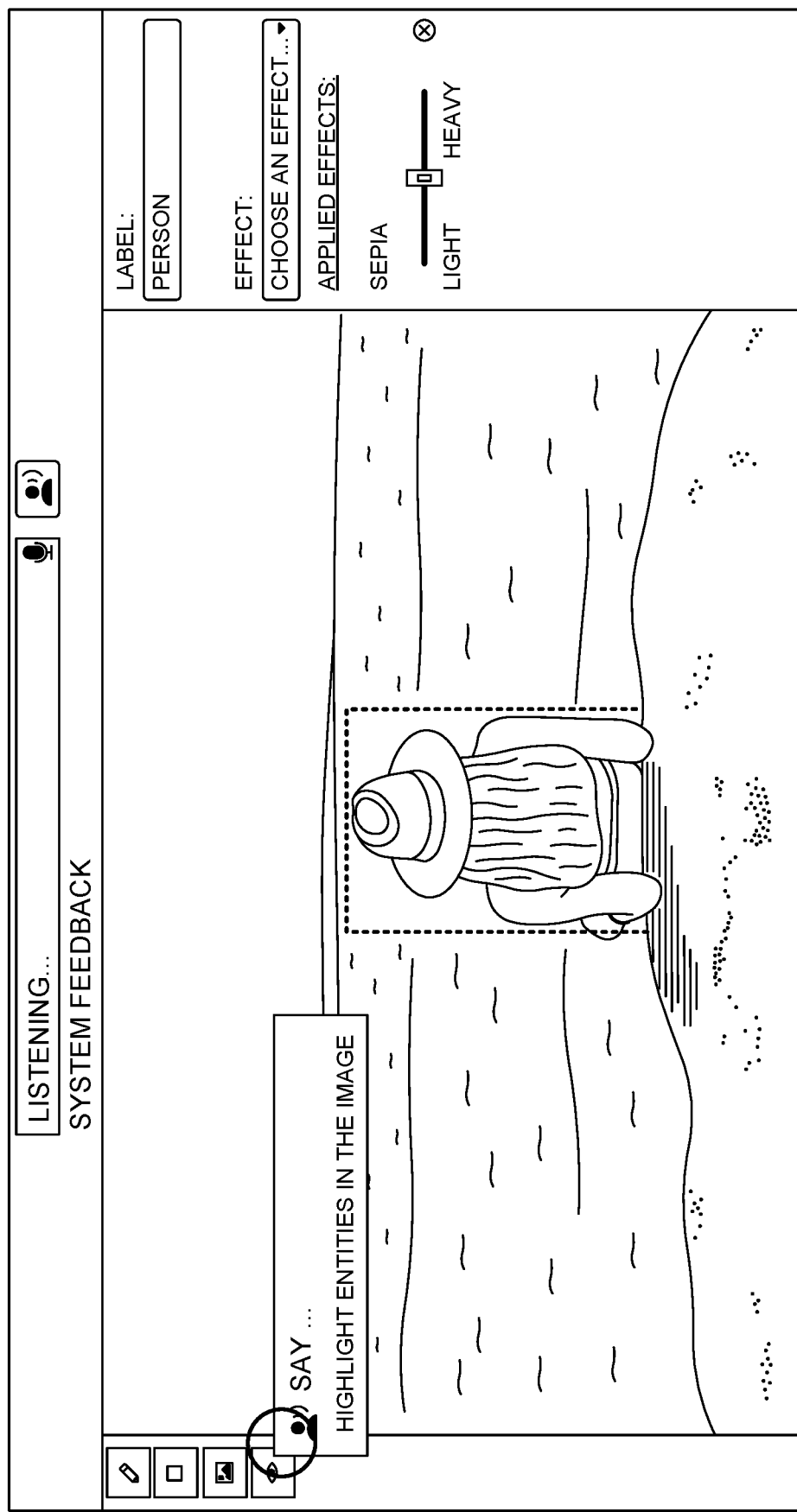
Figure 5D:
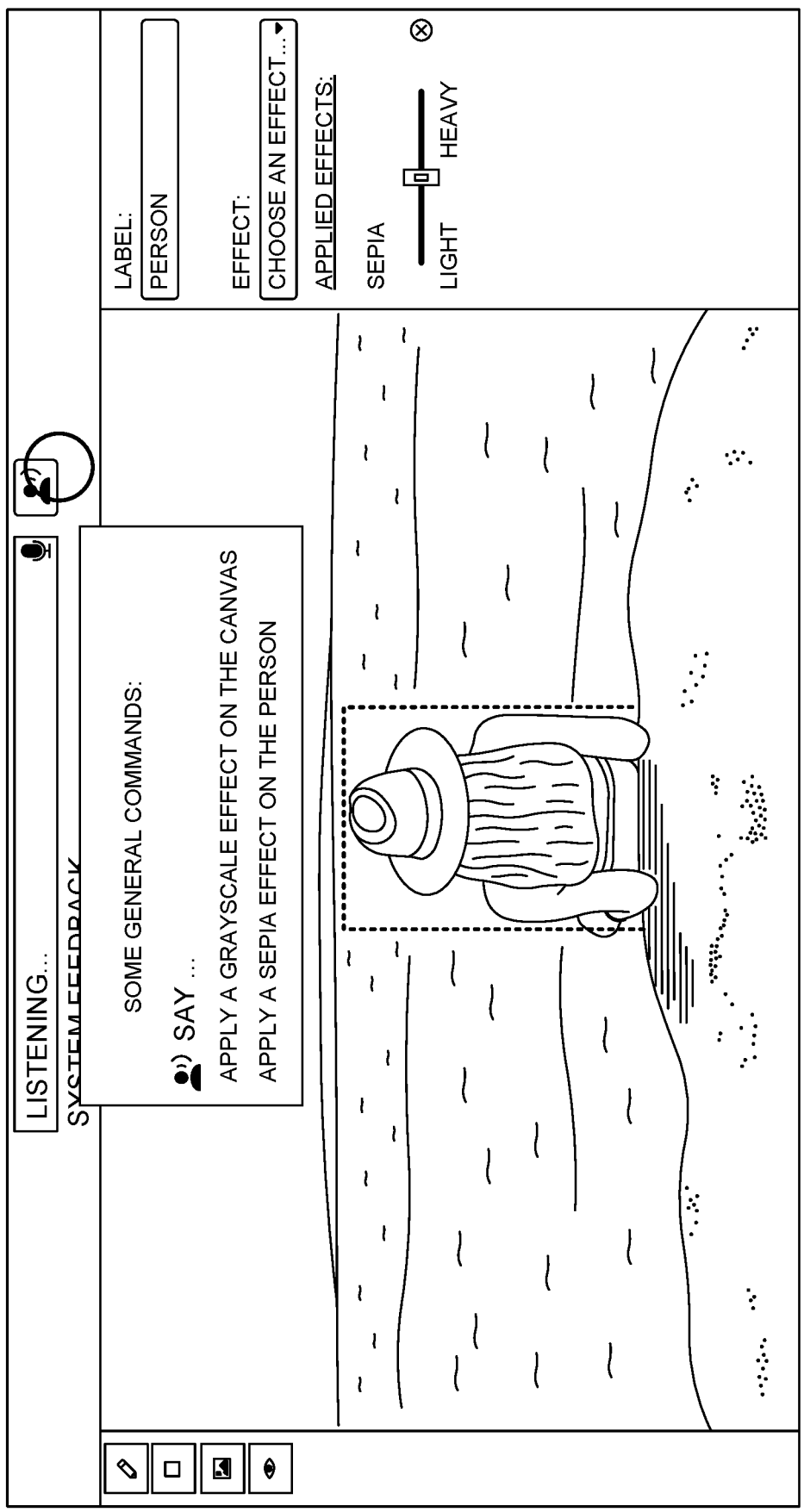
Figure 5E:
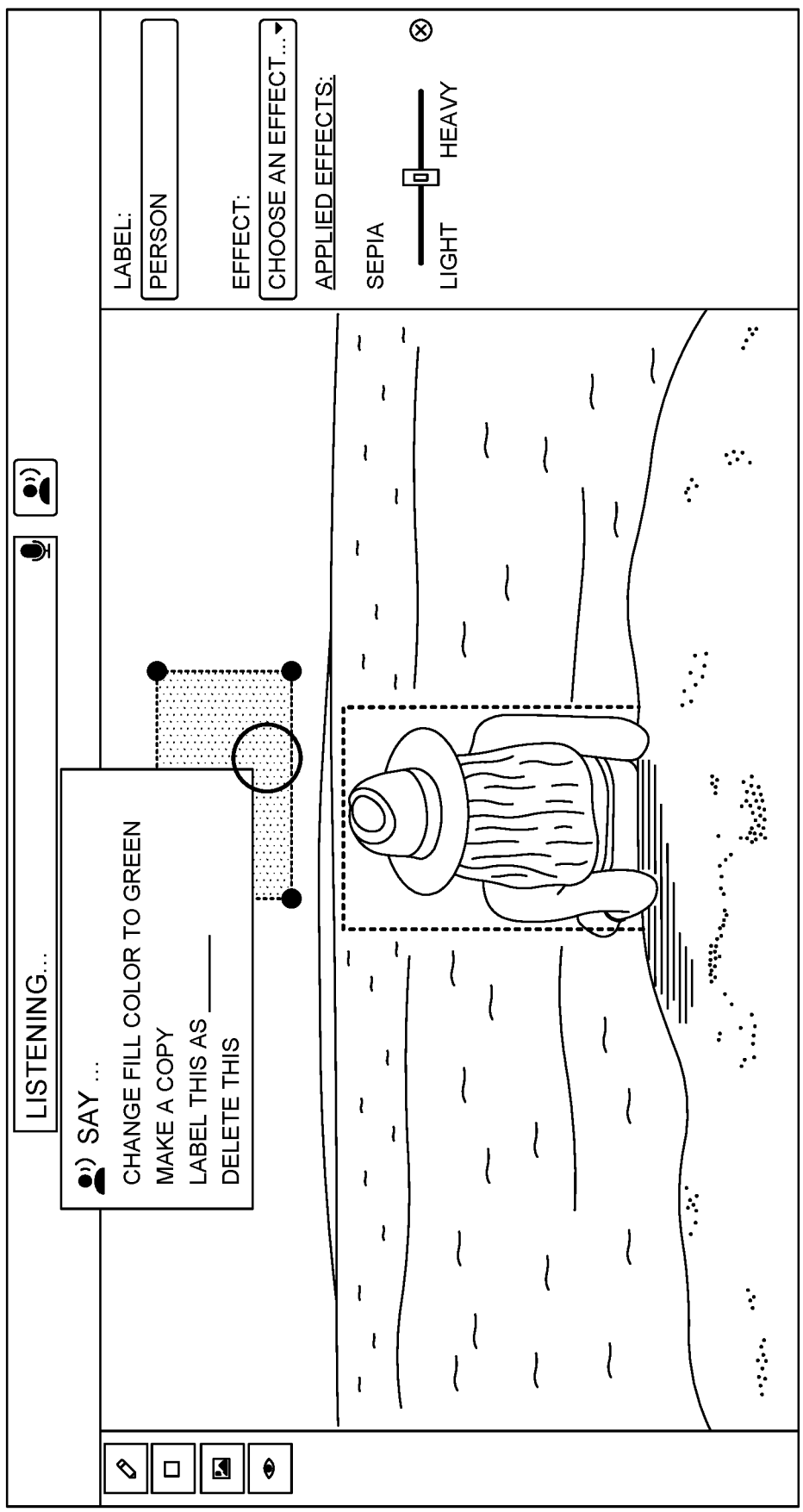

FIGS. 5A-5E depict exemplary screen displays illustrating an adaptive interface in accordance with implementations of the present disclosure. In embodiments, the adaptive interface utilizes tooltip-like overlays to suggest verbal commands relating to a target of the direct-manipulation input. FIG. 5A illustrates presentation of exemplary command suggestions when a user provides a direct-manipulation input on a person in the image of the active window. FIG. 5B illustrates presentation of exemplary command suggestions when a user provides a direct-manipulation input on a dropdown menu, for instance, in a properties panel of the multimodal interface. FIG. 5C illustrates presentation of exemplary command suggestions when a user provides a direct-manipulation input on an entity detection button (that is, a selectable button that, when invoked, detects entities in the active window) that is presented, for instance, in a toolbar. FIG. 5D illustrates presentation of exemplary command suggestions when a user provides a direct-manipulation input on a microphone (talk) trigger. FIG. 5E illustrates presentation of exemplary command suggestions when a user provides direct-manipulation input on a shape shown in the active window of the multimodal interface.

To invoke command suggestions utilizing the adaptive interface, users can long press (e.g., press-and-hold for greater than one second) on different parts of the interface including the active window, widgets and buttons in the properties panel and toolbar, or the talk button. Suggestions are presented through overlays next to the user's finger. Suggestions may be specific to something directly under the user's finger (e.g., a shape or image object) or may apply more generally to the interface. When utilizing a touch-based interface, to avoid occlusion by the hand, the overlays may appear above the user's finger on the active window and be positioned to the left or right of the properties panel and the toolbar, respectively.

In embodiments, suggestions in the adaptive interface are contextual to the target that is under the user's finger. If the target is a widget, the suggestions are about the widget. If the user is touching the active window, the suggestion will be about the object under the user's finger (e.g., background image, a person, shape, etc. when there is an image in the active window). For instance, suggestions for applying filters (e.g., "apply a grayscale filter") may appear when a user long presses on an add-effect widget invocation button (that is, a selectable button that, when selected, invokes the ability to add effects to a widget) in the properties panel or when a user directly manipulates an object in an image.

The system may suggest any number of exemplary available command suggestions for any number of available operations within the scope of embodiments of the present disclosure. In embodiments, the system may suggest one example command per applicable operation. Command phrasings and parameter values vary over time. For example, the user might first see "Apply a sepia effect here" and later "Add a morph filter." To help users get accustomed to using speech, the system initially suggests simpler phrasings with fewer parameters and incrementally exposes users to more complex phrasings with multiple parameters. This is adaptive in relation to the end-user's "learning." For example, if the user issues single commands enough times, the system switches to multi-parameter commands.

As previously set forth, workflow, as utilized herein, is defined as a set of operations that help a user accomplish a task. For instance, if a user is engaged in a workflow using an image editing application to alter a color image by making it black and white and changing a border color from black to white, a relevant workflow may involve the operations "Apply a grayscale filter" and "Change the border color to white." If the user is following a workflow, the adaptive interface restricts the number of suggestions it presents and prioritizes commands that align with the workflow. For instance, a single verbal command may be suggested to apply the sepia filter if that is the next step in the predefined workflow. However, if no predefined workflow is available, in embodiments, the system defaults to the strategy of suggesting one command per applicable operation.

FIGS. 6A through 6D depict exemplary screen displays illustrating an embedded interface in accordance with implementations of the present disclosure. The embedded interface is similar to the adaptive interface with two key differences. First, it creates a visual mapping between GUI elements and their corresponding verbal commands by "augmenting" the GUI widgets with command suggestions. Second it may not consider the user task (i.e., workflow) when choosing relevant examples. The adaptive interface is high precision, low recall and the embedded interface is lower precision, high recall.

Figure 6A:
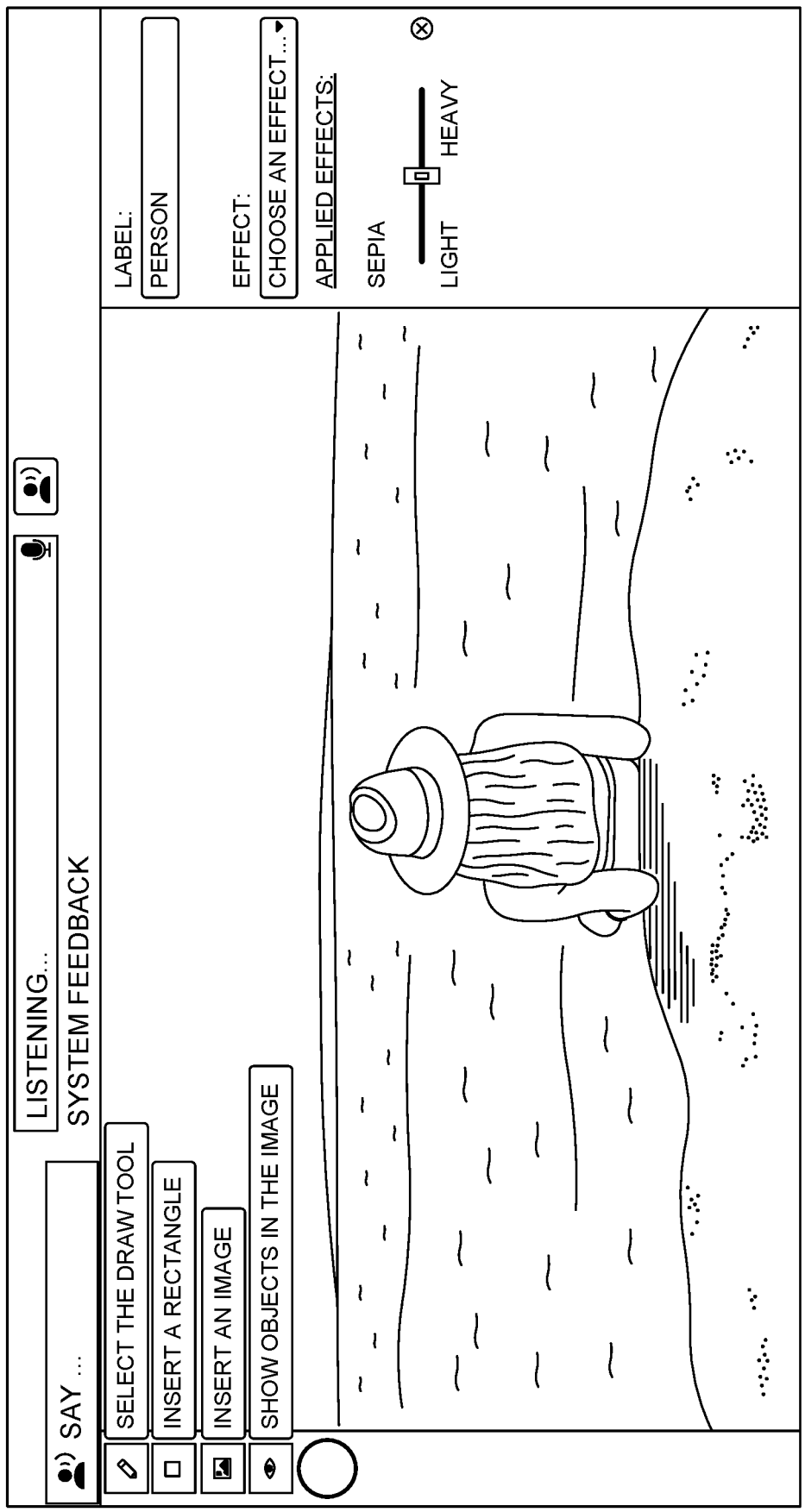
FIGS. 6A-6D depict exemplary screen displays illustrating an embedded interface in accordance with implementations of the present disclosure.
Figure 6B:
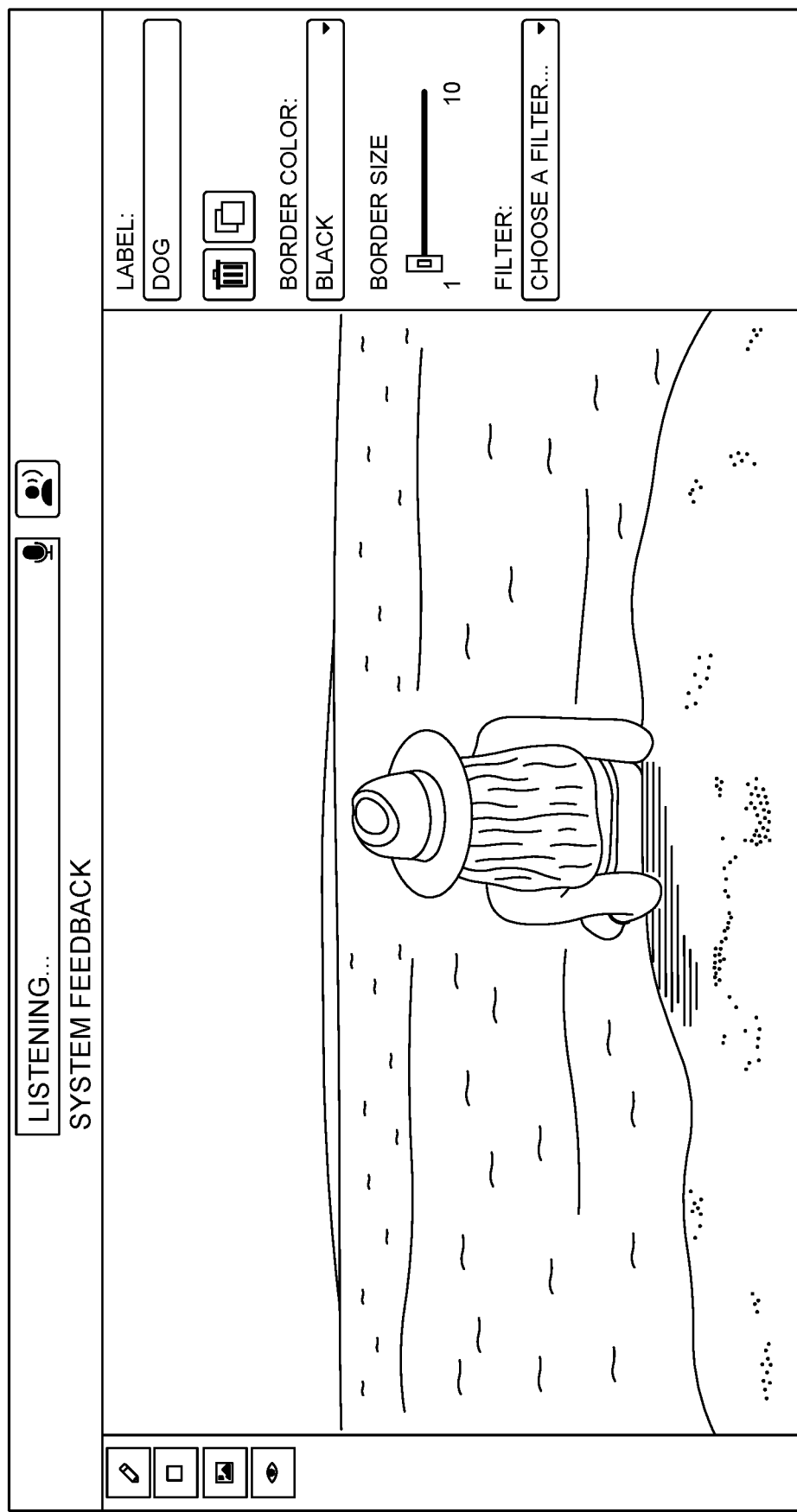
Figure 6C:
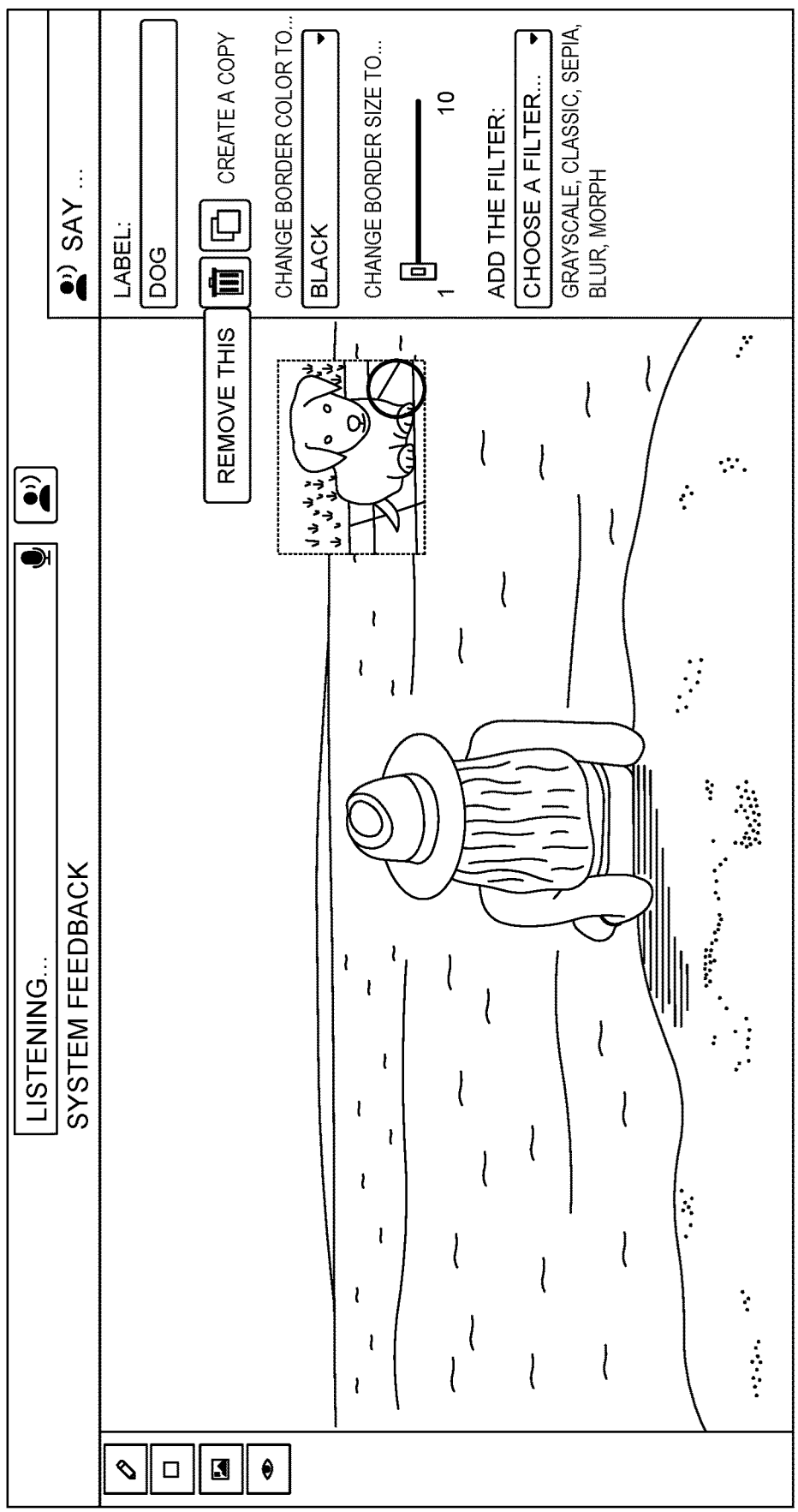
Figure 6D:
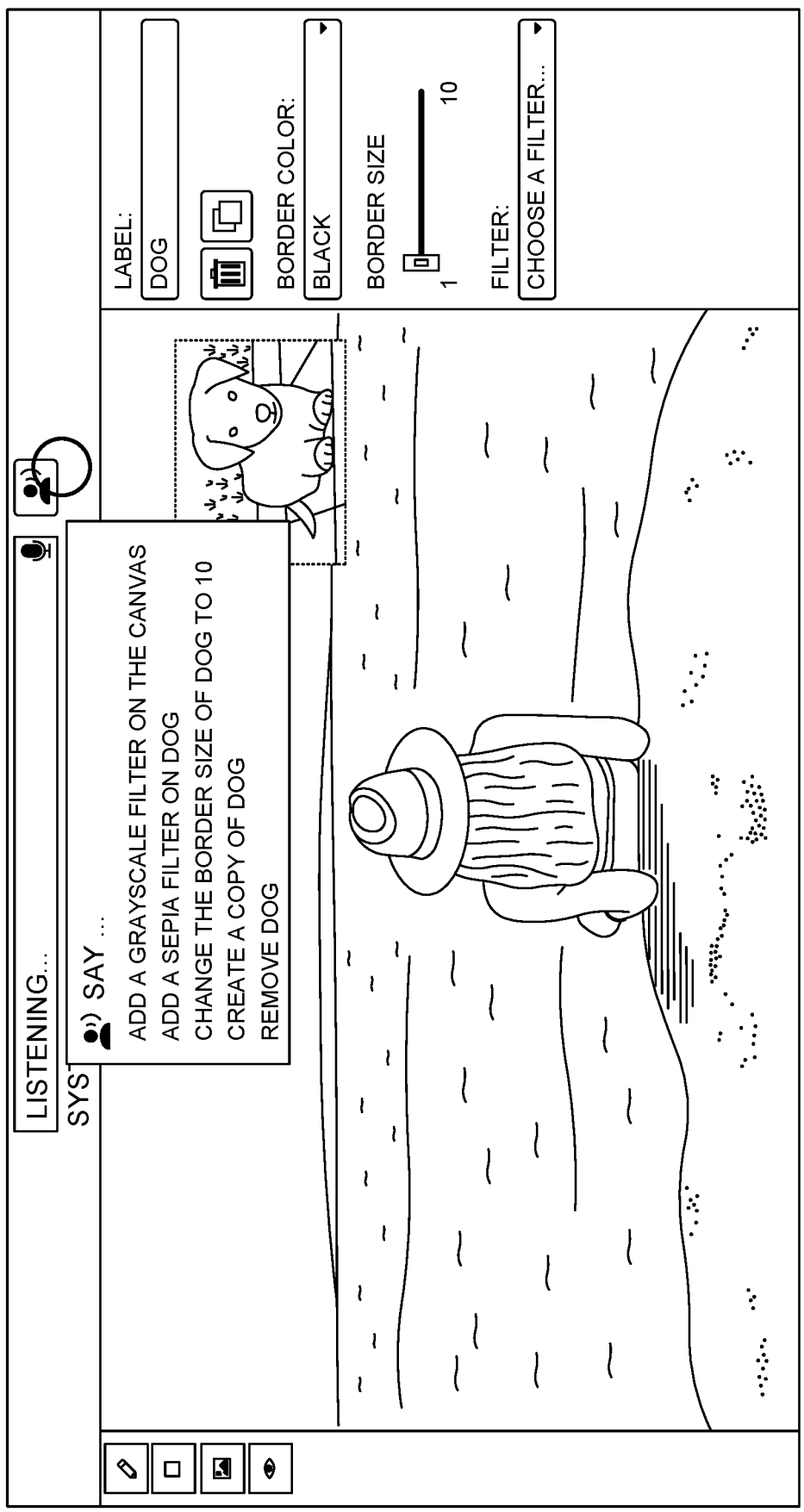

In embodiments, the embedded interface presents command suggestions alongside the application GUI. To view command suggestions, users can long press on different parts of the interface. For instance, if the user long presses on the active window, the system may present command suggestions within the properties panel (FIGS. 6B and 6C). In exemplary embodiments, emphasized (e.g., colored, bolded, etc.) text may correspond to verbal command suggestions augmenting the GUI widgets in the properties panel. In embodiments, to incrementally discover commands corresponding to the interface panels, users may also directly long press on the toolbar (FIG. 6A) or the properties panel (rather than pressing only on objects in the active window). Long pressing the talk button displays both exemplary command suggestions corresponding to objects in the active window (FIG. 6D) and also embeds commands within the toolbar and properties panel.

Because the embedded interface augments the existing GUI widgets, it uses command templates instead of command examples. For instance, the command template "Change border color to" may appear next to a dropdown menu for changing the border color. In embodiments, to provide a consistent experience and give users confidence in how to talk, the system displays the same template throughout a session. Because the toolbar leaves little room to embed text commands, in embodiments, suggestions for the tools in the toolbar may take the form of command examples rather than templates similar to the adaptive interface. The examples presented when the user activates a microphone trigger also follow the same approach as the adaptive interface.

In embodiments, instead of or in addition to presentation of exemplary commands in a user interface such that the same may be read by the user, the system may verbally present command suggestions to the user (that is, may "speak" the command through a speaker associated with a user computing device, for instance, the user computing device 210 of FIG. 2). In exemplary embodiments, a "speak commands" selectable button (not shown) may be selected by the user to prompt the system to provide command suggestions verbally. In embodiments, the default of the system may include verbal presentation. Any and all such variations, and any combination thereof, are contemplated to be within the scope of embodiments of the present disclosure.

In embodiments, once a verbal command is issued by a user, a combination of a template-based and a lexicon-based parser may be utilized to interpret the received verbal command. Speech parsers are known to those having ordinary skill in the art and, accordingly, are not further described herein. Operations, targets and parameters of the verbal command may be identified by comparing the interpreted verbal input to predefined templates. If the interpreted verbal input does not match a template, the system may tokenize the verbal command string and look for specific keywords to infer the same information. In cases where the verbal command does not contain a target, the system may infer the target through the interface state (e.g., which objects were previously selected) or direct manipulation input (e.g., what object was pointed at when the verbal command was issued). In this way, direct manipulation may be used to specify (or disambiguate) portions of a verbal command.

In embodiments, the system includes a feedback mechanism when a verbal command is not interpreted successfully. In all three interfaces, a feedback region may be presented below the text box and also show exemplary command suggestions generated similarly to the manner described herein above but, instead of in response to a direct-manipulation input, the presented suggestions may be in response to an unrecognized verbal input. To suggest exemplary commands in this region, the system infers a failure type most likely, e.g., based upon heuristics. (Heuristics are known to those having ordinary skill in the art and, accordingly, are not further described herein.) A first type of failure type is phrasing errors. Phrasing errors are errors that are identified as commands that contain a valid parameter but are inconsistent with the grammar or lack keywords (e.g., "Make sepia). In such cases, the system may suggest an example command using that parameter value (e.g., "Add a sepia filter"). A second type of failure type is parameter errors. A parameter error is determined if there is a valid operation but a missing or unsupported parameter value (e.g., "Change fill color" or "Add the retro filter"). In parameter error cases, the feedback indicates that the command is incomplete and presents a list of supported values with an example (e.g., "Change fill color to green"). A third error type, operation-object mapping errors, occur when the system infers both operation and parameters but the command is targeted on an unsupported object (e.g., saying "Apply a morph filter" while pointing on a rectangle). In this case, the feedback may list the applicable object types (i.e., images in this example). Finally, if the system is neither able to infer the operation nor the parameter in a command, the system counts this as a fourth type of failure, an operation recognition error, and indicates to the user that they should try one of the offered verbal command suggestions.

In embodiments, the system includes a feedback mechanism when exclusively direct-manipulation input is employed by a user to achieve a task or action. For instance, if a user employs exclusively direct-manipulation input to, by way of example only, select a color in a dialog box using a mouse, the system may inform the user (e.g., in the feedback region beneath the text box) that: "Instead of using the mouse, you could speak the command "Change the color to red." Such proactive action aids in making the user aware not only that verbal commands may be utilized but also educates the user with regard to exemplary commands and appropriate command phraseology.

Figure 7:
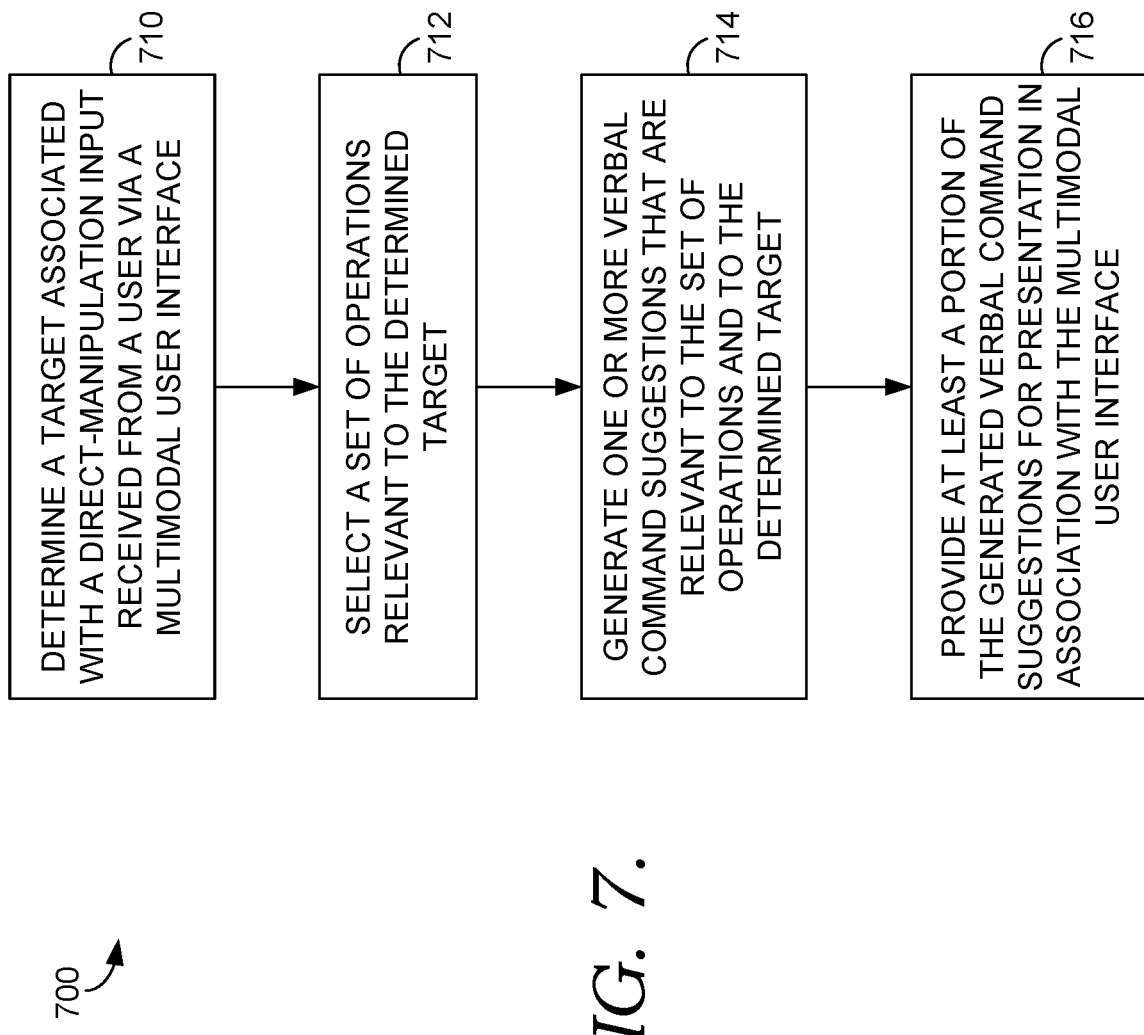
FIG. 7 is a schematic diagram showing an exemplary method for facilitating discoverability of verbal commands in multimodal interfaces, in accordance with implementations of the present disclosure.

Turning now to FIG. 7, illustrated is a schematic diagram showing an exemplary method 700 for facilitating discoverability of verbal commands in a multimodal interface. As indicated at block 710, a target associated with a direct-manipulation input received from a user via a multimodal interface associated with a user computing device (e.g., the user computing device 210 of FIG. 2) is determined (e.g., by the target determining component 218 of the verbal command discovery engine 212 of FIG. 2). As indicated at block 712, a set of operations is selected (e.g., utilizing the operations subset selecting component 222 of the verbal command discovery engine 212 of FIG. 2) on which to focus verbal command suggestions. As indicated at block 714, one or more verbal command suggestions relevant to the selected set of operations is generated, for instance, by the verbal command suggestion generating component 224 of the verbal command discovery engine 212 of FIG. 2. Finally, as indicated at block 716, at least a portion of the generated verbal command suggestions is provided for presentation in association with the multimodal user interface (e.g., utilizing the presenting component 226 of the verbal command discovery engine 212 of FIG. 2) such that discoverability of verbal commands understood by the system is facilitated.

Figure 8:
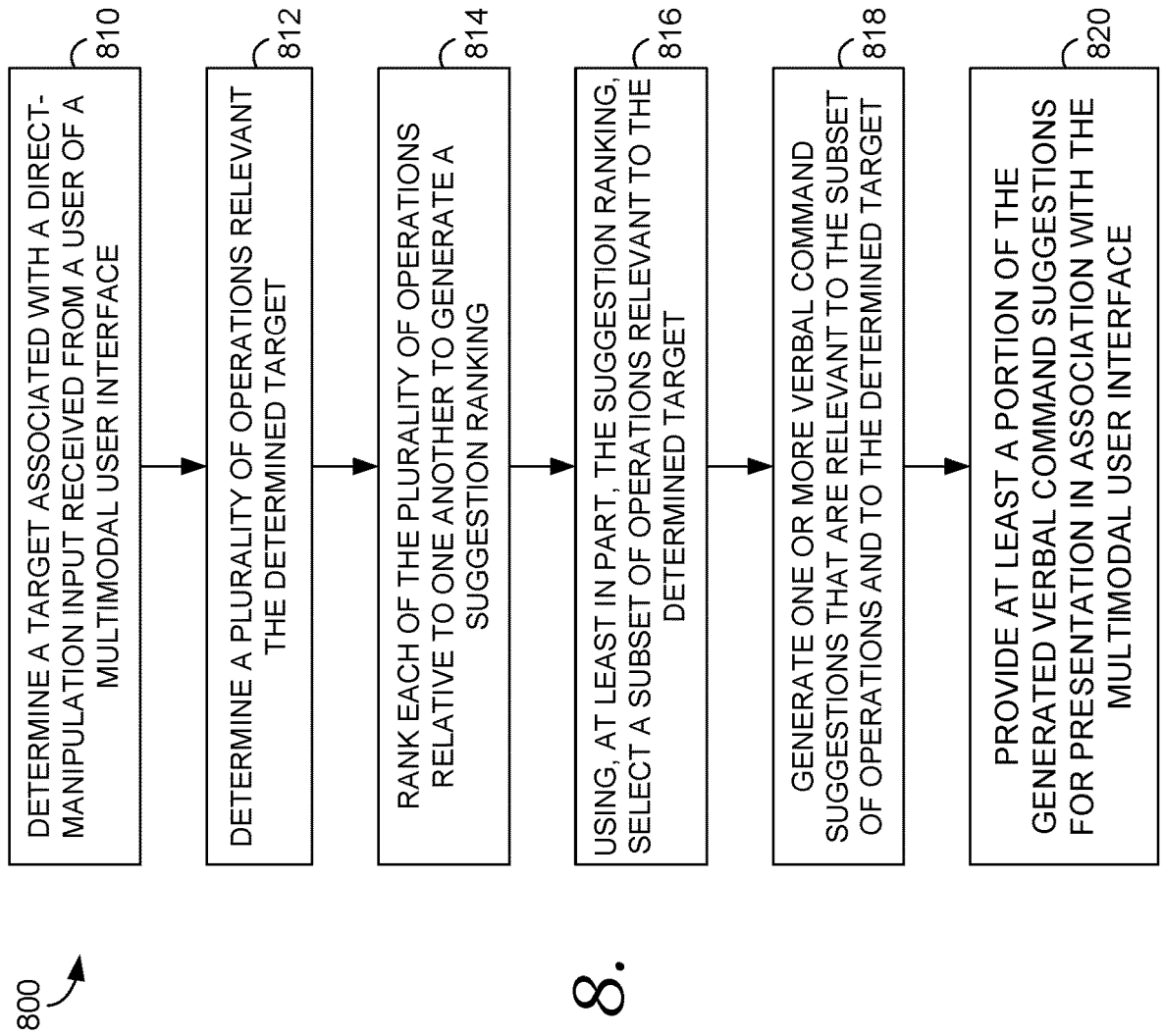
FIG. 8 is a schematic diagram showing an exemplary method for facilitating discoverability of verbal commands in multimodal interfaces, in accordance with implementations of the present disclosure.

With reference to FIG. 8, illustrated is a schematic diagram showing another exemplary method 800 for facilitating discoverability of verbal commands in a multimodal interface. As indicated at block 810, a target associated with a direct-manipulation input received from a user of a multimodal user interface is determined (e.g., by the target determining component 218 of the verbal command discover engine 212 of FIG. 2). As indicated at block 812, a plurality of operations associated with the determined target is determined, for instance, by the operation determining component 220 of the verbal command discovery engine 212 of FIG. 2. As indicated at block 814, the operations comprising the plurality of operations are ranked relative to one another to generate a suggestion ranking (e.g., by the operations ranking component 228 of the operations subset selecting component 222 of the verbal command discovery engine 212 of FIG. 2). As indicated at block 816, using at least in part the suggestion ranking, a subset of the plurality of operations is selected (e.g., utilizing the operations subset selecting component 222 of the verbal command discovery engine 212 of FIG. 2). As indicated at block 818, one or more verbal command suggestions relevant to the subset of operations is generated, for instance, by the verbal command suggestion generating component 224 of the verbal command discovery engine 212 of FIG. 2. Finally, as indicated at block 820, at least a portion of the generated verbal command suggestions is provided for presentation in association with the multimodal user interface (e.g., utilizing the presenting component 226 of the verbal command discovery engine 212 of FIG. 2) such that discoverability of verbal commands understood by the system is facilitated.

Accordingly, embodiments of the present disclosure relate to computing systems for facilitating discovery of verbal commands using multimodal user interfaces. The computer systems may include one or more processors and one or more computer storage media storing computer-useable instructions that, when used by the one or more processors, cause the one or more processors to perform several functions. In embodiments, such functions may include determining a target associated with a direct-manipulation input received from a user via a multimodal user interface; selecting a set of operations relevant to the determined target; generating one or more verbal command suggestions relevant to the selected set of operations and to the determined target; and providing at least a portion of the generated one or more verbal command suggestions for presentation in association with the multimodal user interface such that discoverability of verbal commands understood by the system is facilitated.

Embodiments of the present disclosure further relate to computer-implemented methods for facilitating discovery of verbal commands using multimodal interfaces. Such computer-implemented methods may include determining a target associated with a direct-manipulation input from a user of a multimodal user interface; determining a plurality of operations associated with the determined target; ranking operations comprising the plurality of operations relative to one another to generate a suggestion ranking; using, at least in part, the suggestion ranking, selecting a subset of the plurality of operations relevant to the determined target; generating one or more verbal command suggestions relevant to the selected subset of operations and to the determined target; and providing at least a portion of the generated one or more verbal command suggestions for presentation in association with the multimodal user interface such that discoverability of verbal commands by the user is facilitated.

Some embodiments of the present disclosure relate to computing systems for facilitating discovery of verbal commands using multimodal interfaces. Such computing systems may comprise means for generating one or more verbal command suggestions relevant to a target of a direct-manipulation input received from a user via multimodal user interface; and means for providing at least the portion of the one or more verbal command suggestions for presentation in association with the multimodal user interface such that discoverability of verbal commands understood by the system is facilitated.

Figure 9:
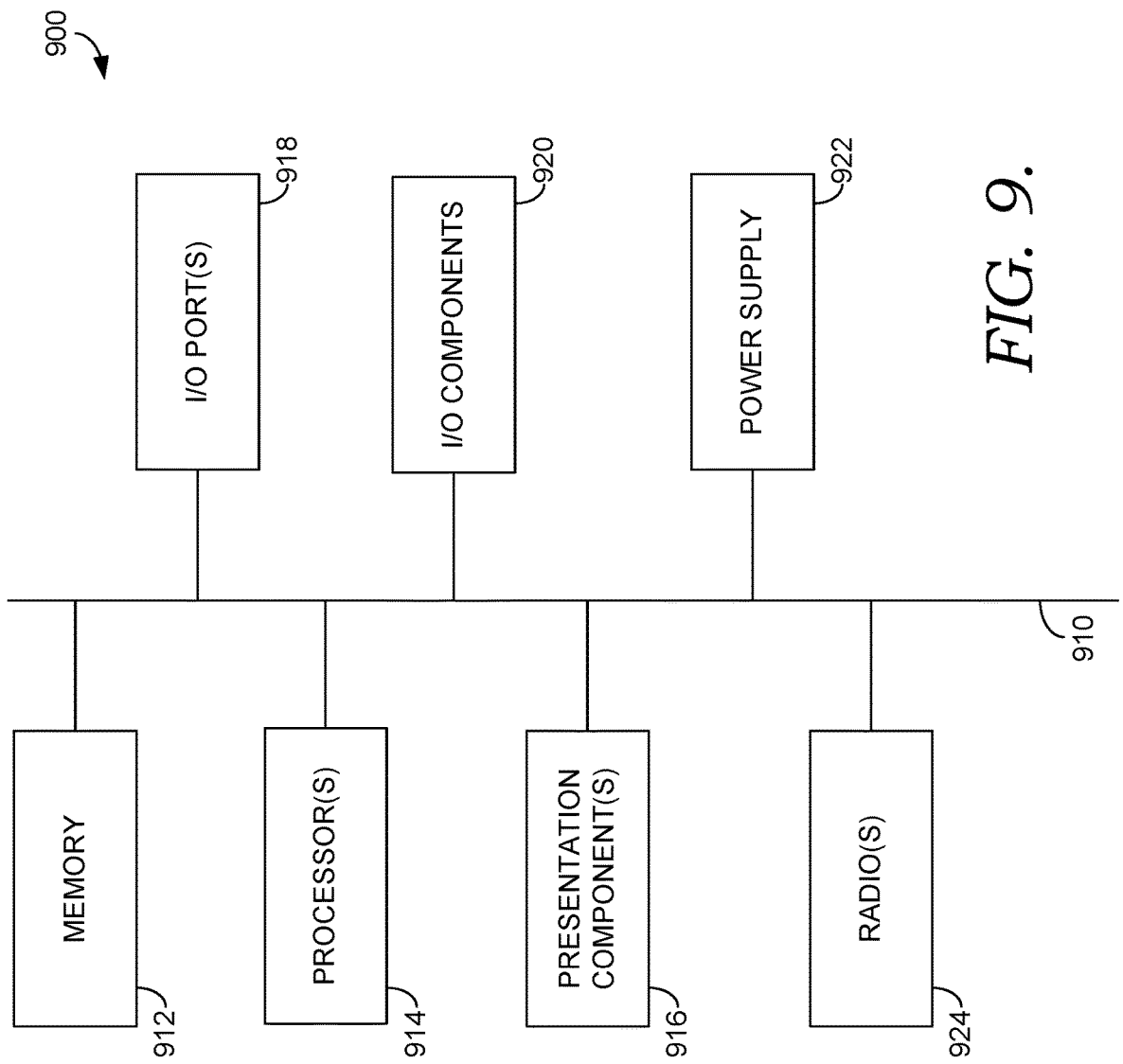
FIG. 9 is a block diagram of an exemplary computing environment suitable for use in implementations of the present disclosure.

Having described implementations of the present disclosure, an exemplary operating environment in which embodiments of the present disclosure may be implemented is described below in order to provide a general context for various aspects hereof. Referring to FIG. 9, an exemplary operating environment for implementing embodiments of the present disclosure is shown and designated generally as computing device 900. The computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments hereof may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present disclosure may be practiced in a variety of system configurations, including hand-held devices, consumer electronics, general-purpose computers, more specialty computing devices, etc. Embodiments of the present disclosure also may be practiced in distributed computing environments where tasks are performed by remote-processing devices that are linked through a communications network.

With continued reference to FIG. 9, the computing device 900 includes a bus 910 that directly or indirectly couples the following devices: a memory 912, one or more processors 914, one or more presentation components 916, input/output (I/O) ports 918, input/output components 920, and an illustrative power supply 922. The bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

The computing device 900 typically includes a variety of computer-readable media. Computer-readable media can be any available media that can be accessed by the computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 912 includes computer storage media in the form of volatile and/or nonvolatile memory. The memory may be removable, non-removable, or a combination thereof. Exemplary hardware devices include solid-state memory, hard drives, optical-disc drives, etc. The computing device 900 includes one or more processors that read data from various entities such as the memory 912 or the I/O components 920. The presentation component(s) 916 present data indications to a user or other device. Exemplary presentation components include a display device, speaker, printing component, vibrating component, etc.

The I/O ports 918 allow the computing device 900 to be logically coupled to other devices including the I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 600 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

As described above, implementations of the present disclosure relate to a framework for generating and presenting examples of verbal commands (e.g., natural language commands) to facilitate discoverability of relevant verbal commands understood by systems supporting multimodal interfaces and to permit users to incrementally explore available verbal commands. The present disclosure has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computing system comprising:
one or more processors; and
one or more computer storage media storing computer-useable instructions that, when used by the one or more processors, cause the one or more processors to:
select an operation relevant to a determined target associated with a direct-manipulation input of a multimodal interface;
generate, using a phrasing template selected based on a quantity of modifiable parameters in the phrasing template, a verbal command suggestion relevant to the selected operation for the determined target; and
cause display, via the multimodal interface, of the verbal command suggestion presented adjacent to the determined target associated with the direct-manipulation input of the multimodal interface.

2. The computing system of claim 1, wherein the computer-useable instructions, when used by the one or more processors, further cause the one or more processors to populate at least one modifiable parameter of the phrasing template with a parameter value to generate the verbal command suggestion.

3. The computing system of claim 2, wherein the computer-useable instructions, when used by the one or more processors, cause the one or more processors to populate the at least one modifiable parameter with the parameter value based on at least one of an active state of the target and relevance to a workflow engaged in by a user.

4. The computing system of claim 1, wherein the received direct-manipulation input is one of a touch input, a keyboard input, an eye-tracking input, a gesture input, or a mouse input.

5. The computing system of claim 1, wherein the verbal command suggestion is a natural language command suggestion.

6. The computing system of claim 1, wherein selecting the phrasing template is based on at least one of a type of the direct-manipulation input received and a complexity of the phrasing template.

7. The computing system of claim 1, wherein the determined target comprises an object in an image, a menu, or a button.

8. The computing system of claim 1, wherein the verbal command suggestion corresponds with a prioritized command that aligns with a workflow.

9. A computer-implemented method, comprising:
identifying a direct-manipulation input of a multimodal interface indicating selection to present a list of available operations and corresponding verbal command suggestions; and
causing display, via the multimodal interface, of the list of available operations and a set of verbal command suggestions corresponding with each operation in the list of available operations, wherein, based on contextual information, operations and verbal command suggestions unapplicable to an active state of the multimodal interface are visually deemphasized while displayed.

10. The computer-implemented method of claim 9, wherein an available operation and a corresponding set of verbal command suggestions associated with the available operation are presented as a group within the multimodal interface.

11. A computer-implemented method comprising:
select an operation relevant to a determined target associated with a direct-manipulation input of a multimodal interface;
generate, using a phrasing template selected based on a quantity of modifiable parameters in the phrasing template, a verbal command suggestion relevant to the selected operation for the determined target; and
cause display, via the multimodal interface, of the verbal command suggestion presented in association with the determined target corresponding with the direct-manipulation input of the multimodal interface.

12. The computer-implemented method of claim 11, wherein the determined target is within an image, and the verbal command suggestion is presented within a property panel.

13. The computer-implemented method of claim 12, wherein emphasized text corresponds to the verbal command suggestion augmenting a graphical user interface widget in the property panel.

14. The computer-implemented method of claim 11, wherein the determined target is within a property panel, and the verbal command suggestion is presented within the property panel.

15. The computer-implemented method of claim 11, wherein the determined target is a talk button.

16. The computer-implemented method of claim 15, wherein when the determined target is the talk button, a first set of verbal command suggestions corresponding to objects in an image and a second set of verbal command suggestions are embedded within a presented toolbar or property panel.

17. The computer-implemented method of claim 11, further comprising causing display of a feedback region that presents one or more command suggestions in response to an unrecognized verbal input.

18. The computer-implemented method of claim 17, wherein the one or more command suggestions are generated based on inferring a most likely failure type, wherein failure types include a phrasing error, a parameter error, an operation-object mapping error, or an operation recognition error.

\* \* \* \* \*